United States Patent Office 3,541,162
Patented Nov. 17, 1970

3,541,162
PREPARATION OF HALONITROALCOHOLS
John M. Larkin, Hopewell Junction, and Donald R. Lachowicz, Fishkill, N.Y., assignors to Texaco Inc., New York, N.Y., a corporation of Delaware
No Drawing. Filed Dec. 14, 1967, Ser. No. 694,020
Int. Cl. C07c 31/34
U.S. Cl. 260—633
11 Claims

ABSTRACT OF THE DISCLOSURE

A method for preparing halonitroalcohols having at least 4 carbon atoms by heating a vicinal nitroalkyl nitrate having at least 4 carbon atoms in the presence of a halogen-donating reagent at a temperature of at least 100° C. where the donating halogen has a bond dissociation energy of from 25 to 65 kcal./mole. The halonitroalcohols so prepared correspond to the formulas:

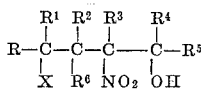

and

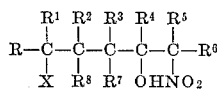

where the R and $R^{1-8}$ groups are hydrogen or alkyl, X is a halogen of the group iodine, bromine and chlorine and are useful as solvents, plasticizers, bactericides, lubricant additives and fuel additives.

---

This invention relates to a novel method of preparing multifunctional organic compounds from nitroalkyl nitrates. In particular, it relates to a method for preparing halonitroalcohols by the thermal rearrangement and halogenation of vicinal nitroalkyl nitrates.

In the past, preparations of multifunctional halonitroalcohols has been accomplished by reaction of haloaldehydes with nitro compounds, by reaction of halonitro compounds with aldehydes, or by reaction of halo-olefins with nitrogen dioxide followed by hydrolysis. Although such reactions produced halonitroalcohols in varying degrees the product sought was formed in relatively poor yields, and in admixture with other materials such as aldehyde condensation products or dinitrohaloalkanes which presented isolation and purification difficulties.

A method has now been found whereby halonitroalcohols can be produced in substantially higher yields from vicinal nitroalkyl nitrates in admixture with minor amounts of cyclic nitro ethers and nitro olefins which permit processing without the necessity of utilizing complicated and expensive purification procedures. Moreover, the halonitroalcohols produced by our method possess a specific and highly reproducible arrangement not heretofore obtainable by prior art methods wherein a hydroxy group is borne on the carbon atoms originally bearing the nitrate group and a halo group is positioned on a carbon atom 3 atoms away from the carbon bearing the hydroxy.

It is therefore an object of this invention to provide a method for the preparation of halonitroalcohols.

Another object of this invention is to provide a method for the preparation of halonitro alcohols in high yields.

Yet another object of this invention is to provide novel and reproducible multifunctional organic compounds.

Other objects and advantages will become apparent from a reading of the following detailed description and examples.

Broadly, this invention contemplates a method of preparing a halonitroalcohol having at least 4 carbon atoms which comprises providing a vicinal nitroalkyl nitrate having at least 4 carbon atoms and heating said vicinal nitroalkyl nitrate in the presence of a halogen-donating reagent where the donating halogen has a bond dissociation energy of from 25 to 65 kcal./mole at a temperature of at least 100° C.

According to this invention, the contemplated halonitroalcohols correspond to the formula:

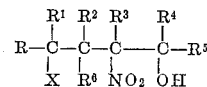

and

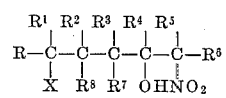

where the R and $R^{1-8}$ groups are hydrogen or alkyl and where X is a halogen selected from the group consisting of iodine, bromine and chlorine. The contemplated vicinal nitroalkyl nitrate precursor and halonitroalcohol each comprise at least 4 carbon atoms and may contain as many as 200 carbons or higher. Preferably, the precursor or alcohol comprise from 4 to 80 carbon atoms.

Vicinal nitroalkyl nitrates contemplated as starting materials in the instant invention include for example 1-nitro-2,4,4-trimethyl-2-pentyl nitrate, 3-nitro-2,4,4-trimethyl-2-pentyl nitrate, 1-nitro-2-methyl-2-pentyl nitrate, 1-nitro-2-methyl-2-hexyl nitrate, 1-nitro-4-methyl-2-pentyl nitrate, 1-nitro-2-pentyl nitrate, 1-nitro-2-hexyl nitrate, mixtures of 4-nitro-5-nonyl nitrate and 5-nitro-4-nonyl nitrate, 1-nitro-2-dodecyl nitrate, mixtures of 7-nitro-8-pentadecyl nitrate and 8-nitro-7-pentadecyl nitrate, 1-nitro-2-octadecyl nitrate, mixtures of 3-nitro-4-eicosyl nitrate and 4-nitro-3-eicosyl nitrate, 1-nitro-2-docosyl nitrate, 2-nitro-1-butyl-1-cyclopentyl nitrate, 1-carboxy-8-nitro-9-heptadecyl nitrate and 1-carboxy-9-nitro-8-heptadecyl nitrate. Mixtures of vicinal nitroalkyl nitrates is similarly contemplated.

The vicinal nitroalkyl nitrates thermally rearranged and halogenated to halonitroalcohols in accordance with this invention may be prepared by the procedure described in U.S. Pat. 3,282,983. According to this procedure an alkene is contacted simultaneously with dinitrogen tetroxide and oxygen at a temperature between −40 and 20° C. to form a nitroalkyl peroxynitrate. The intermediate nitroalkyl peroxynitrate is thereafter contacted with a reducing agent at a temperature of between −20 and 30° C. to form the vicinal nitroalkyl nitrate. The vicinal nitroalkyl nitrate precursor contemplated in the instant invention corresponds to the formula:

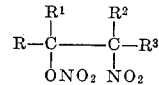

where the R, $R^1$, $R^2$ and $R^3$ groups are hydrogen or alkyl and at least one of said groups is alkyl, where the nitrate has a chain of 4 carbon atoms adjacent the nitrato group and further where the fourth carbon atom has an available hydrogen atom attached thereto. Carboxy, alkoxy, sulfone or phenoxy groups, alone or in combination may be present in the precursor, preferably as a substituent on an alkyl group.

Thermal rearrangement and halogenation of the vicinal nitroalkyl nitrate precursor employed in the instant invention to the halonitroalcohol is accomplished by heating at a temperature of at least 100° C. up to a temperature of approximately 500° C. and preferably from about 103° C. to 250° C. for periods ranging from about a few seconds (about 2 seconds) to 24 hours or longer. In conjunction therewith conversion to the halonitroalcohol is accomplished by thermal treatment in the presence of a halogen-donating reagent, that is a compound capable of donating bromine, chlorine or iodine. Illustrative of the halogen-donating reagents contemplated by this invention we mention bromochlorofluoromethane, bromodichloromethane, bromodifluoromethane, dibromochloromethane, dibromofluoromethane, tribromomethane, bromochloroiodomethane, dibromoiodomethane, bromofluoroiodomethane, dibromoiodomethane, triiodomethane, dichloroiodomethane, difluoroiodomethane, tetrabromomethane, tetraiodomethane, dibromochlorofluoromethane, bromotrichloromethane, dibromodichloromethane, iodotrichloromethane, bromotrifluoromethane, bromopentachloroethane, 1-iodo-2-chlorohexafluoropropane, benzylidene dichloride, chlorine, bromine, iodine, N-bromosuccinimide, N-bromoacetamide, phosphorus pentachloride, nitrosyl chloride and sulfuryl chloride.

As exemplified above both organic and inorganic halogen donating reagents are applicable to the instant invention where the reagent's bond dissociation energy between the donating halogen and atom attached thereto ranges from about 25 to about 65 kcal./mole and preferably in the range of from 30 to 58 kcal./mole.

Preferred halogen-donating reagents are the halocarbons corresponding to the formula:

$$C_nH_vBr_wCl_xF_yI_z$$

where $n$ is from 1 to 4, where $v+w+x+y+z=2n+2$, where $v+x+y=0$ to $2n+1$ and and where $w+z=1$ to $2n+2$. Highly preferred reagents occur where $v=0$, $w$ or $z$ equal 1 to 4, $n$ equals 1 to 2 and $x$ or $y$ equal $2n$ or $2n+1$ as in bromotrichloromethane and dibromodichloromethane.

Halogen donating reactivity conforms to the order of iodine>bromine>chlorine with the absence of successful results when employing fluorine. When employing a compound having two or more halogens as the donating reagent, mixed products are obtained where the highest product yields correspond to the more reactive halogen. Further where is is desired to employ lower boiling reagents, that is reagents boiling below 100° C., vessels permitting higher autogenous pressure and temperature is permissible.

Where it is contemplated to avoid mixed halogenated products, halogenated hydrocarbons containing only hydrogen and/or fluorine together with the desired halogen, i.e., iodine or bromine or chlorine, is preferred. Particularly preferred reagents are perhalohydrocarbons which contain fluorine and the desired halogen.

In another preferred embodiment, the reagent contains from one to two carbon atoms, that is the preferred reagents are halogenated methanes and ethanes. Unsaturated ethylenic compounds though operative are not preferred inasmuch as they give rise to undesirable side reactions. Further, the desired halogen should be present in the reagent in the preferred ratio of one to two atoms per molecule, the remainder being hydrogen, or fluorine.

The vicinal nitroalkyl nitrate is contacted with the halogen-donating reagent under the conditions set out above in a mole ratio of nitrate to reagent of between about 1:1 and 1:500, preferably from 1:4 to 1:100. The conversion may moreover be conducted in the presence of inert diluents including a wide range of hydrocarbons such as heptane, octane, nonane, dodecane, benzene, toluene, xylene, orthodichlorobenzene, chlorobenzene, diphenyl ether, and perhalogenated fluoroalkanes.

Specific examples of thermally rearranged vicinal nitroalkyl nitrates to the halonitroalcohol prepared according to the inventive process include 1-nitro-2,4,4-trimethyl-5-bromo - 2 - pentanol, 3 - nitro - 5 - bromo 2,4,4 trimethyl - 2 - pentanol, 1 - nitro - 2 - methyl - 5 - bromo-2 - pentanol, 1 - nitro - 5 - bromo - 2 - octanol, 1 - nitro-5 - bromo - 2 - dodecanol, 1 - nitro - 5 - bromo - 2 - octadecanol, mixtures of 1 - bromo - 3 - nitro - 4 - eicosanol, 7 - bromo - 3 - nitro - 4 - eicosanol and 6 - bromo - 4 - nitro - 3 - eicosanol, mixtures of bromo - nitro - hydroxystearic acids, and the bromonitroalcohol derived from the nitroalkyl nitrate of a polybutene of 940 average molecular weight.

When the vicinal nitroalkyl nitrate is heated in the presence of a halogen-donating reagent in accordance with the procedure described above the product is a halonitroalcohol where the hydroxy group is on the carbon atom originally bearing the nitrate and a halo group is positioned on a carbon atom 3 atoms away. The original vicinal nitro group is now vicinal to the hydroxy group in its original position.

The method of the invention, for purposes of illustration and visualization is further explained by the following equations:

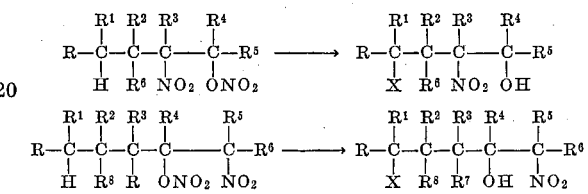

where R, $R^1$, $R^2$, $R^3$, $R^4$, $R^5$, $R^6$, $R^7$ and $R^8$ groups are hydrogen or alkyl and where X is a halogen of the group bromine, iodine and chlorine. As can be seen, the functional members, that is, the halogen, nitro and hydroxy groups are positioned one to another as follows: hydroxyhalogen 1-4, hydroxynitro 1-2 and halogen-nitro either 1-3 or 1-5, the positional numbers being relative to the group's position along the carbon chain.

The halonitroalcohols prepared according to this invention are useful as solvents, plasticizers, bactericides, lubricant and fuel additives. Further they are useful as intermediates in the preparation of cyclic nitro ethers, gamma haloketones, cyclic amines, pharmaceuticals, biocides, fungicides, dyestuffs and lubricants additives.

In order to more fully illustrate the nature of our invention and manner of practicing the same the following examples are presented.

EXAMPLE I

To a solution of 5.6 grams (0.05 mole) of 2,4,4-trimethyl-1-pentene in 55 milliliters of carbon tetrachloride maintained at 0° C. there was simultaneously added over a period of 4¾ hours 3.1 milliliters (0.05 mole) of dinitrogen tetroxide and 60.5 milliliters per minute of oxygen. The system was thereafter flushed with nitrogen and the flask contents cooled to approximately −5 to −10° C. Nitric oxide was bubbled through the solution at the rate of 60.5 milliliters per minute for 22 minutes. The resulting blue-green solution was stirred at approximately −10° C. for an additional 15 minutes. The solvent was subsequently removed under vacuum at room temperature. 10.79 grams of 1-nitro-2,4,4 - trimethyl - 2 - pentyl nitrate was recovered.

A solution of 2.80 grams of 1-nitro-2,4,4-trimethyl-2-pentyl nitrate in 50 milliliters of bromotrichloromethane was heated at reflux (104–105° C.) for 17 hours. The solvent was subsequently removed under vacuum at 45° C. and 3.02 grams of a yellow liquid was recovered. By chromatography on silica gel and elution with methylene chloride and 80% methylene chloride -20% ether there was obtained 2.39 grams, corresponding to a yield of 74 percent, of product identified by infrared to be 1-nitro-2,4,4-trimethyl-5-bromo-2-pentanol.

EXAMPLE II 5.6 grams (0.05 mole) of 2,4,4-trimethyl - 2 - pentene in 55 milliliters of carbon tetrachloride was treated with dinitrogen tetroxide and oxygen, followed by nitric oxide reduction as in Example 1. The product was indicated by infrared to be 3-nitro-2,4,4-trimethyl - 2 - pentyl nitrate. The yield of product was 10.64 grams.

A solution of 2.20 grams of 3-nitro-2,4,4-trimethyl-2-pentyl nitrate in 75 milliliters of bromotrichloromethane was heated at reflux (103–104° C.) for 10 hours. The solvent was subsequently removed under vacuum at 38° C. 2.13 grams of a yellow oil was recovered and identified by infrared to be 3-nitro-5-bromo-2,4,4-trimethyl-2-pentanol.

EXAMPLE III

To a solution of 4.7 grams (0.05 mole) of 2-methyl-1-pentene in 55 milliliters of carbon tetrachloride maintained at 0° C. there was simultaneously added over a period of 4¾ hours 3.1 milliliters (0.05 mole) of dinitrogen tetroxide and 60.5 milliliters per minute of oxygen followed by nitric oxide reduction as in Example I. This product was indicated by infrared to be 1-nitro-2-methyl-2-pentyl nitrate. The yield was 10.27 grams.

A solution of 1.35 of 1 - nitro - 2 - methyl-2-pentyl nitrate in 75 milliliters of bromotrichloromethane was heated at reflux (105.3° C.) for 31 hours. The solvent was removed under vacuum at 35° C. and 1.23 gram of a yellow-brown liquid identified by infrared to be 1-nitro-2-methyl-5-bromo-2-pentanol was recovered.

EXAMPLE IV

To a stirred solution of 11.2 milliliters (0.1 mole) of 1-octane in 55 milliliters of carbon tetrachloride maintained at 0° C. there was simultaneously introduced 6.2 milliliters (0.1 mole) of dinitrogen tetroxide and 60.5 milliliters per minute of oxygen over a period of 6 hours. The colorless solution was flushed with nitrogen and cooled −10 to 20° C. and while stirring nitric oxide was bubbled in at the rate of 60.5 milliliters per minute for 38 minutes. The resulting blue-green solution was allowed to warm to room temperature and the solvent was subsequently removed under vacuum. A yellow oil weighing 21.62 grams was recovered and identified as 1-nitro-2-octyl nitrate.

A solution of 4.50 grams of 1-nitro-2-octyl nitrate in 125 milliliters of dibromodichloromethane was heated at reflux (133–135° C.) for 24 hours. The solvent was thereafter removed under vacuum at 60° C. leaving 6.13 grams of a brown oil. By extraction with methylene chloride and 90% methylene chloride-10% ether there was obtained a dark oil which under infrared analysis was identified as containing 1-nitro-5-bromo-2-octanol.

EXAMPLE V

A 5% solution of 1-nitro - 2,4,4 - trimethyl-2-pentyl nitrate is heated in 100 ml. of chlorobenzene at 110° C. while chlorine gas is simultaneously introduced at a rate in excess of 100 ml./min. After the solvent is removed by distillation at reduced pressure, there is obtained 1-nitro-2,4,4-trimethyl-5-chloro-2-pentanol.

EXAMPLE VI

The solution in Example V is similarly heated except that iodine (10 g.) replaces the chlorine. After removal of the solvent there is obtained 1-nitro-2,4,-trimethyl-5-iodo-2-pentanol.

EXAMPLE VII

To a solution of 60 g. of a polybutene of 940 average molecular weight in 120 ml. of chlorobenzene maintained at 0–4° C. there was added 5.2 g. of gaseous $NO_2$ in a stream of oxygen (65 ml./min.) during a 4½ hour period. An infrared analysis indicated the product to be a nitro nitrate of the 940 average molecular weight polybutene.

To the solution of this nitro nitrate in chlorobenzene there is added 120 ml. of dibromodichloromethane, and the solution is heated at reflux for six hours. The solvent is removed by vacuum distillation, and the residue consists mainly of a bromonitroalcohol of a polybutene of 940 average molecular weight.

EXAMPLE VIII

The procedure of Example VII is repeated except that N-bromosuccinimide (0.5 mole) replaces the dibromodichloromethane and sufficient additional chlorobenzene is added to make a homogeneous solution. After heating at reflux the same bromonitroalcohol is obtained as in Example VII.

EXAMPLE IX

The procedure of Example VII is repeated except that phosphorous pentachloride (0.5 mole) replaces the dibromodichloromethane. In this manner, a chloronitroalcohol of a polybutene of 940 average molecular weight is obtained.

EXAMPLE X

The procedure of Example VII is repeated except that sulfuryl chloride (0.5 mole) replaces the dibromodichloromethane. In this manner, the same chloronitroalcohol is obtained as in Example IX.

We claim:
1. A method of preparing a halonitroalcohol having 4 to 200 carbon atoms which comprises providing a vicinal nitroalkyl nitrate having 4 to 200 carbon atoms and heating said nitrate at a temperature of 100° C. to 500° C. in the presence of a halogen-donating reagent, wherein said reagent's donating halogen is selected from the group consisting of bromine, chlorine and iodine, wherein said reagent is selected from the group consisting of benzylidene dichloride, chlorine, bromine, iodine, N-bromosuccinmide, N-bromoacetamide, phosphorous pentachloride, nitrosyl chloride, sulfuryl chloride and halocarbons corresponding to the formula

$C_nH_vBr_wCl_xF_yI_z$ wherein $n$ is from 1 to 4, where $v+w+x+y+z=2n+2$, where $v+x+y=0$ to $2n+1$ and where $w+z=1$ to $2n+2$, and where said reagent's donating halogen has a bond dissociation energy ranging from about 25 to abount 65 kcal./mole.

2. A method according to claim 1 wherein said nitrate to reagent mole ratio is from 1:1 to 1:500.

3. A method according to claim 1 wherein said heating is conducted at a temperature of from 103° C. to 250° C.

4. A method according to claim 1 wherein said reagent's donating halogen bond dissociation energy ranges from about 30 to about 58 kcal./mole.

5. A method according to claim 1 wherein said reagent corresponds to the formula:

$C_nH_vBr_wCl_xF_yI_z$ where $n$ is from 1 to 4, where $v+w+x+y+z=2n+2$ where $v+x+y=0$ to $2n+1$ and where $w+z=1$ to $2n+2$.

6. A method according to claim 1 wherein said reagent is bromotrichloromethane.

7. A method according to claim 1 wherein said reagent is dibromodichloromethane.

8. A method according to claim 1 wherein said halonitroalcohol is 1-nitro-2,4,4-trimethyl-5-bromo-2-pentanol.

9. A method according to claim 1 wherein said halonitroalcohol is 1-nitro-2-methyl-5-bromo-2-pentanol.

10. A method according to claim 1 wherein said halonitroalcohol is 3-nitro-5-bromo-2,4,4-trimethyl-2-pentanol.

11. A method according to claim 1 wherein said halonitroalcohol is 1-nitro-5-bromo-2-octanol.

References Cited

UNITED STATES PATENTS

| | | | |
|---|---|---|---|
| 2,123,556 | 7/1938 | Nicodemus et al. | 260—633 |
| 2,978,512 | 4/1961 | Frankel et al. | |
| 2,999,118 | 9/1961 | Bachman et al. | 260—633 |

FOREIGN PATENTS 1,057,131  2/1967  Great Britain.

OTHER REFERENCES

Nikolinski et al.: Chem, Abst., vol. 56, 3336c, 1962.
Batueva et al.: Izv. Vyssh., Ucheb., Zaved., Khim. Khim. Tekhnol. 10(4), 420–2 (1957).

LEON ZITVER, Primary Examiner

H. T. MARS, Assistant Examiner

U.S. Cl. X.R.

44—72, 79; 252—51.5, 364; 260—32.4, 999

PO-1050
(5/69)

UNITED STATES PATENT OFFICE
CERTIFICATE OF CORRECTION

Patent No. 3,541,162    Dated November 17, 1970

Inventor(s) JOHN M. LARKIN and DONALD R. LACHOWICZ

It is certified that error appears in the above-identified patent and that said Letters Patent are hereby corrected as shown below:

Column 1, line 30, after "alkyl" insert --and--

Column 3, line 41, first "is" to --it--

Column 4, lines 21-24

$$\text{"R} - \underset{\underset{H}{|}}{\overset{\overset{R^1}{|}}{C}} - \underset{\underset{R^8}{|}}{\overset{\overset{R^2}{|}}{C}} - \underset{\underset{R}{|}}{\overset{\overset{R^3}{|}}{C}} - \underset{\underset{ONO_2}{|}}{\overset{\overset{R^4}{|}}{C}} - \underset{\underset{NO_2}{|}}{\overset{\overset{R^5}{|}}{C}} - R^6 \text{"}$$

should read $$-- \text{R} - \underset{\underset{H}{|}}{\overset{\overset{R^1}{|}}{C}} - \underset{\underset{R^8}{|}}{\overset{\overset{R^2}{|}}{C}} - \underset{\underset{R^7}{|}}{\overset{\overset{R^3}{|}}{C}} - \underset{\underset{ONO_2}{|}}{\overset{\overset{R^4}{|}}{C}} - \underset{\underset{NO_2}{|}}{\overset{\overset{R^5}{|}}{C}} - R^6 --$$

Column 5, line 37, "-10 to 20° C." should read -- -10 to -20° C. --.

Column 5, line 65, "1-nitro-2,4-trimethyl-5" should read --1-nitro-2,4,4-trimethyl--

Signed and sealed this 9th day of May 1972.

(SEAL)
Attest:

EDWARD M. FLETCHER, JR.
Attesting Officer

ROBERT GOTTSCHALK
Commissioner of Patents